(12) United States Patent
Chen

(10) Patent No.: US 7,819,016 B2
(45) Date of Patent: Oct. 26, 2010

(54) NON-DISPOSABLE AND REUSABLE AIR PRESSURE GAUGE

(76) Inventor: Kuo-Liang Chen, No. 246-1, Changma Rd., Changhua (TW)

( * ) Notice: Subject to any disclaimer, the term of this patent is extended or adjusted under 35 U.S.C. 154(b) by 115 days.

(21) Appl. No.: 12/380,873

(22) Filed: Mar. 3, 2009

(65) Prior Publication Data
US 2010/0224005 A1    Sep. 9, 2010

(51) Int. Cl.
*G01L 7/00* (2006.01)
(52) U.S. Cl. .......................................... 73/756; 73/700
(58) Field of Classification Search ................ None
See application file for complete search history.

(56) References Cited
U.S. PATENT DOCUMENTS
4,058,016 A * 11/1977 Schwartz ..................... 73/716
4,295,117 A * 10/1981 Lake et al. ..................... 338/4
4,850,227 A * 7/1989 Luettgen et al. ............... 73/708
5,263,241 A * 11/1993 Hart et al. ..................... 29/827
5,377,403 A * 1/1995 Hart et al. ..................... 29/827
6,427,316 B1 * 8/2002 Shinjo et al. ............... 29/602.1
6,779,406 B1 * 8/2004 Kuznia et al. ................ 73/756

* cited by examiner

*Primary Examiner*—Lisa M Caputo
*Assistant Examiner*—Jermaine Jenkins
(74) *Attorney, Agent, or Firm*—Charles E. Baxley

(57) ABSTRACT

An air pressure gauge has a housing, a circuit board, a pressure detector and a display. The housing is hollow and has a base, a cover, an engaging device, multiple protrusions and detents and a seal. The cover is pivotally connected to the base with a pivotal tab integrally formed between and connected to the base and the cover. The engaging device is mounted between the base and the cover and has an engaging recess and an engaging tab engaging each other. The protrusions and detents are mounted respectively on the base and the cover and engage each other. The seal is mounted between the base and the cover.

3 Claims, 5 Drawing Sheets

NON-DISPOSABLE AND REUSABLE AIR PRESSURE GAUGE

BACKGROUND OF THE INVENTION

1. Field of the Invention

The present invention relates to an air pressure gauge, and more particularly to a non-disposable and reusable electronic air pressure gauge.

2. Description of Related Art

With reference to FIG. 6, an air pressure gauge is always mounted on a pneumatic system to detect air pressure in pipes of the system. An air pressure gauge may be electronic and has a display to show the air pressure to users to allow them to know the conditions of the air pressures in the system.

The conventional air pressure gauge has a housing and multiple elements, including the display, a circuit board, a pressure detector and a battery held in the housing. The housing is sealed with a high frequency plastic welding process or the like after the elements are mounted in/on the housing. However, when the power of the battery is off, the whole air pressure gauge has to be replaced with a new one because the housing is sealed and cannot be opened. Therefore, this causes waste of resource and increase the cost of using the air pressure gauge. Especially in a pneumatic system having a high airflow, the usage of the air pressure gauge is in a high frequency and the power of the battery is easily off in a short time. Thus, the conventional air pressure gauge has to be replaced frequently and the cost of using the conventional air pressure gauge is high.

To overcome the shortcomings, the present invention tends to provide an air pressure gauge to mitigate or obviate the aforementioned problems.

SUMMARY OF THE INVENTION

The main objective of the invention is to provide an air pressure gauge that is reusable to make the cost for using the air pressure gauge being lowered. The air pressure gauge comprises a housing, a circuit board, a pressure detector and a display. The housing is hollow and comprises a base, a cover, an engaging device, multiple protrusions and detents and a seal. The base has a connecting end and an engaging end. The cover is pivotally connected to the base and has a connecting end and an engaging end. The connecting end is pivotally connected with the connecting end of the base with a pivotal tab integrally formed between and connected to the connecting ends of the base and the cover. The engaging end corresponds to and detachably engages the engaging end of the base. The engaging device is mounted between the engaging ends of the base and the cover and comprises an engaging recess and an engaging tab. The engaging recess is defined in the engaging end of the base. The engaging tab is formed on and protrudes from the engaging end of the cover and has at least one engaging hook engaging the engaging recess in the base. The protrusions and detents are mounted respectively on the base and the cover and engage each other. The seal is mounted between the base and the cover. The circuit board is mounted in the housing and provided with a power source. The pressure detector is mounted in the housing and is electrically connected to the circuit board. The display is mounted on the housing and is electrically connected to the circuit board.

Other objects, advantages and novel features of the invention will become more apparent from the following detailed description when taken in conjunction with the accompanying drawings.

DETAILED DESCRIPTION OF PREFERRED EMBODIMENT

Figure 1:
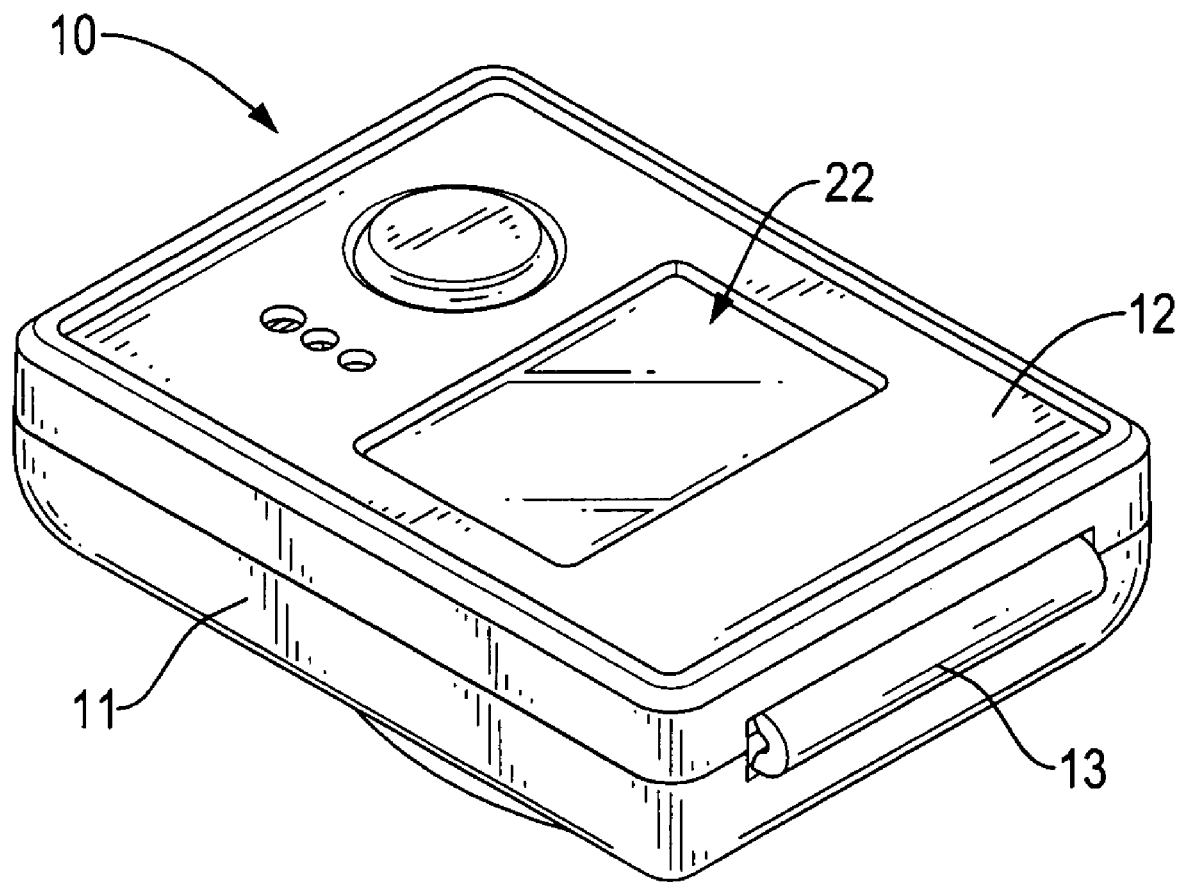
FIG. 1 is a perspective view of an air pressure gauge in accordance with the present invention.
Figure 2:
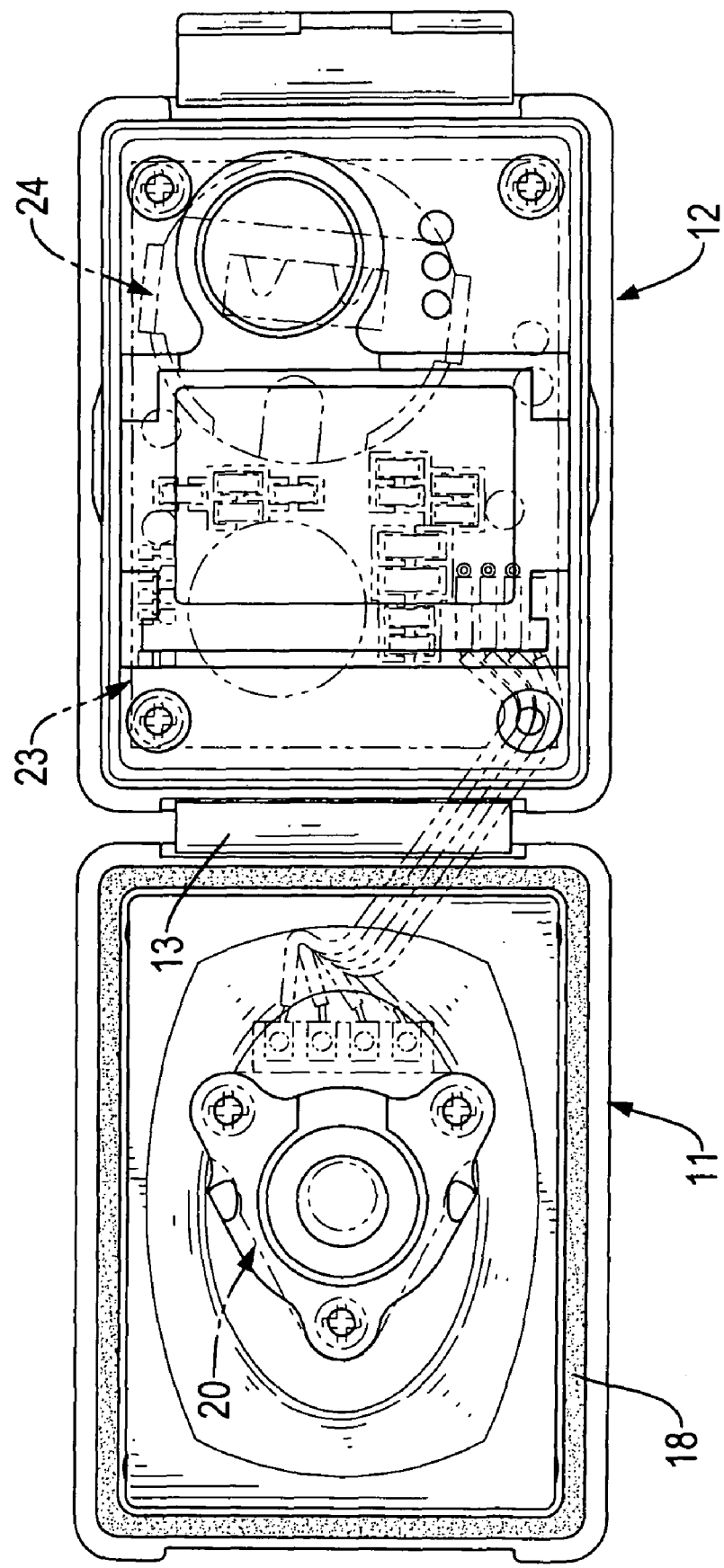
FIG. 2 is a top view of the air pressure gauge in FIG. 1 with the housing being opened.
Figure 3:
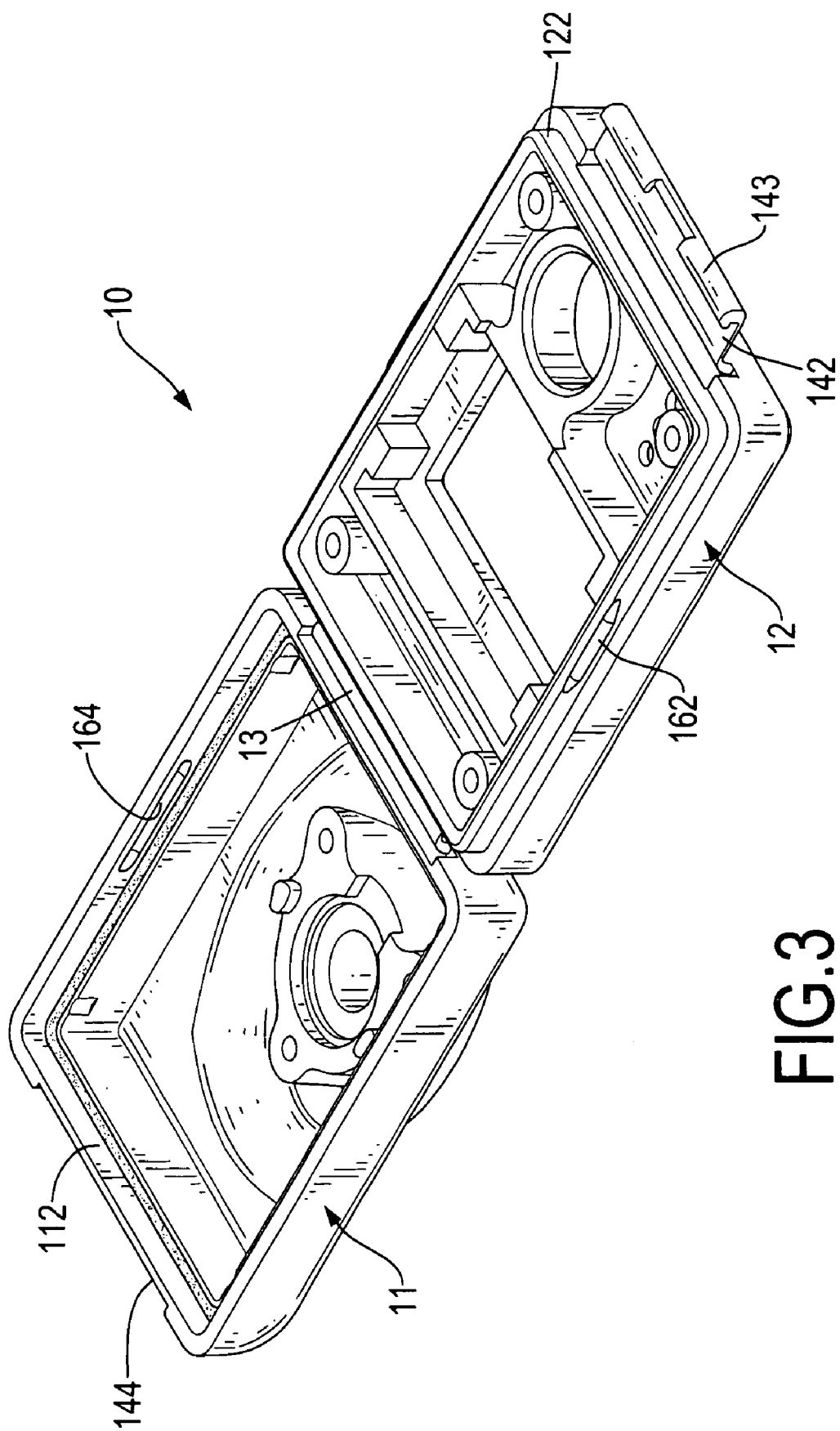
FIG. 3 is a perspective view of the opened housing of the air pressure gauge in FIG. 1.

With reference to FIGS. 1 to 3, an air pressure gauge in accordance with the present invention comprises a housing (10), a circuit board (23) provided with a power source (24), a pressure detector (20), a display (22). The circuit board (23), the power source (24), may be a battery, the pressure detector (20), the display (22) are mounted in/on the housing (10), are connected electrically with together and may be conventional, so detail descriptions of these elements are omitted.

Figure 4:
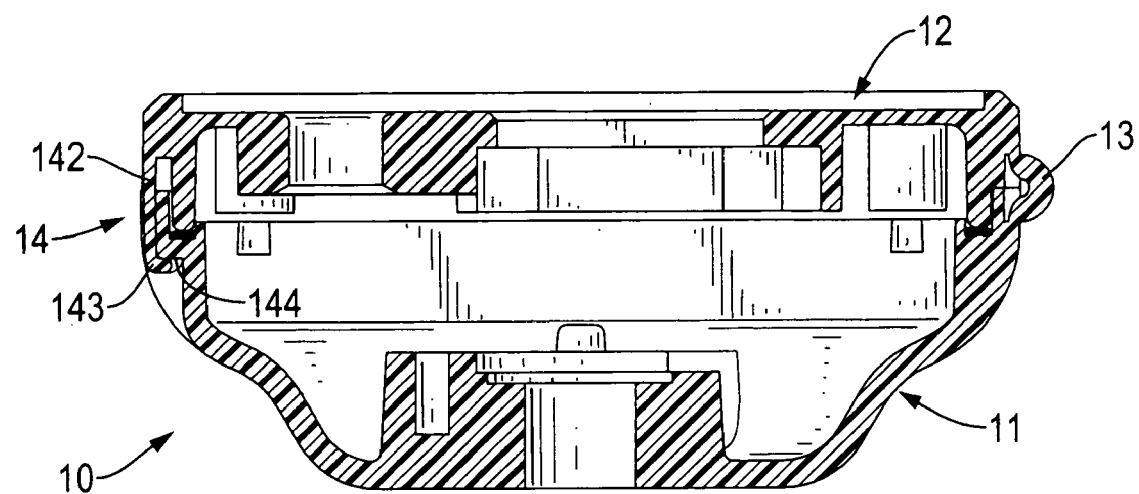
FIG. 4 is a cross sectional side view of the housing of the air pressure gauge in FIG. 1.
Figure 5:
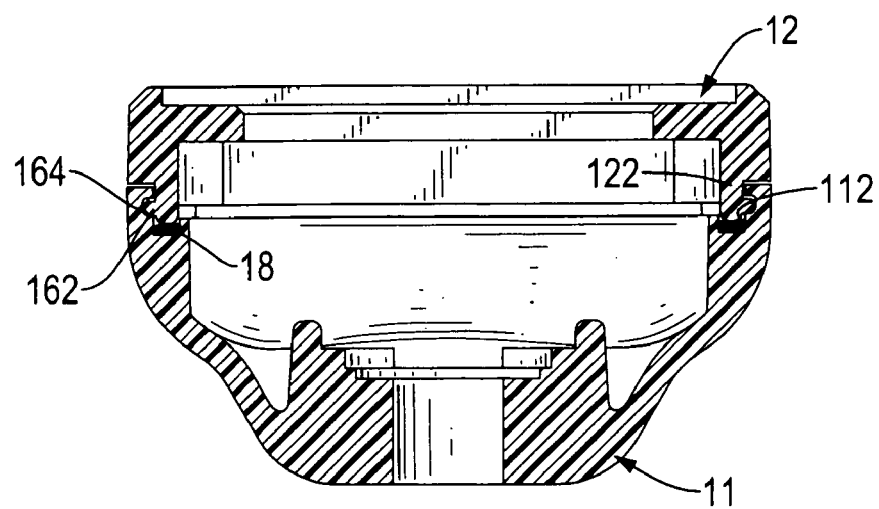
FIG. 5 is a cross sectional end view of the housing of the air pressure gauge in FIG. 1.
Figure 6:
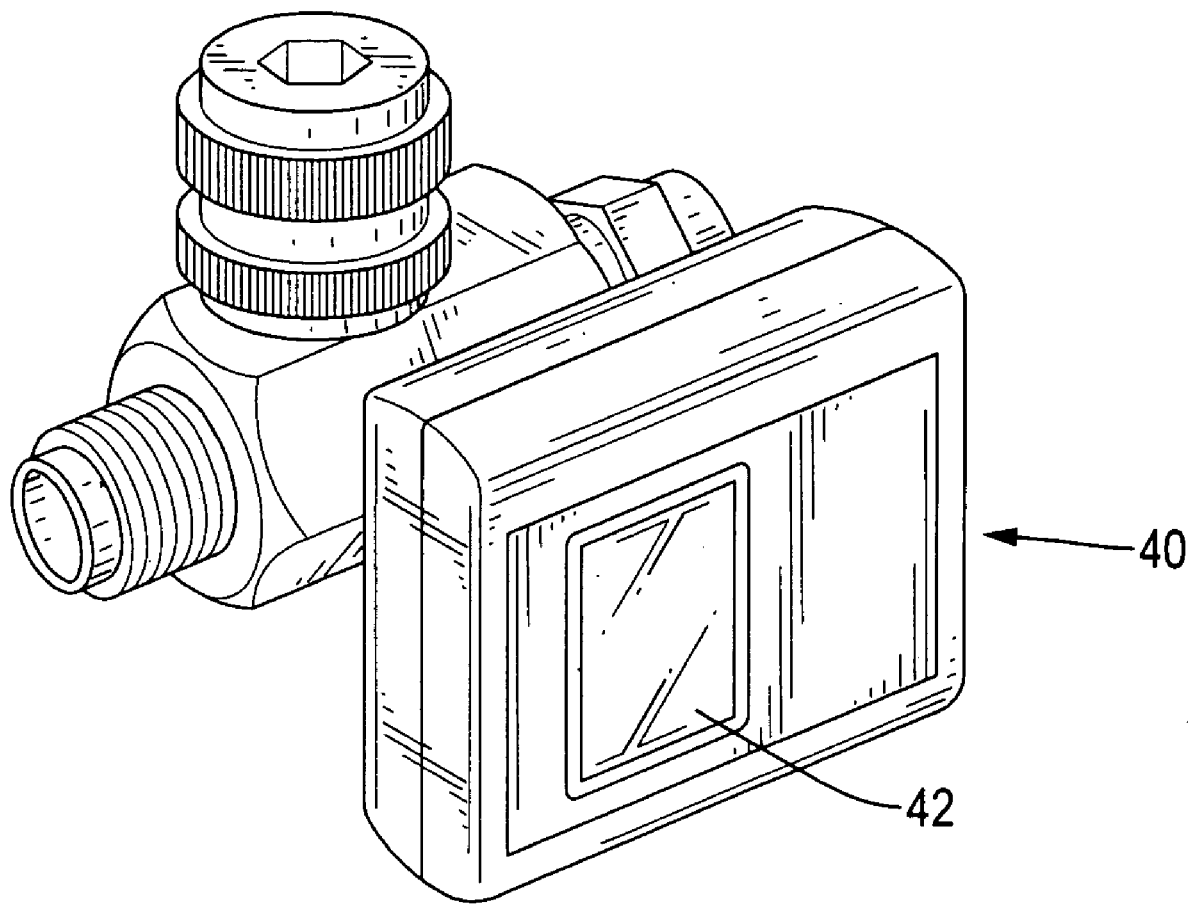
FIG. 6 is a perspective view of a valve of a pneumatic system with a conventional electronic air pressure gauge.

With further reference to FIGS. 4 and 5, the housing (10) is hollow and comprises a base (11), a cover (12), an engaging device (14), multiple protrusions (162) and detents (164) and a seal (18).

The base (11) has a connecting end, an engaging end and an annular groove (112), and the pressure detector (20) may be mounted in the base (11). The annular groove (112) is defined in the base (11) at a side facing the cover (12).

The cover (12) is pivotally connected to the base (11) and has a connecting end, an engaging end and an annular flange (122), and the circuit board (23), the power source (24) and the display is mounted in/on the cover (12). The connecting end of the cover (12) is pivotally connected with the connecting end of the base (11) with a pivotal tab (13) integrally formed between and connected to the connecting ends of the base (11) and the cover (12). The engaging end of the cover (12) corresponds to and detachably engages the engaging end of the base (11). The annular flange (122) is formed on and protrudes from the cover (12) at a side facing the base (11) and is extended into and held in the annular groove (112) when the cover (12) is closed relative to the base (11). In an alternative embodiment, the annular recess (112) is defined in the cover (12) on which the display (22) is mounted, and the annular flange (122) is formed on the base (11) in which the pressure detector (20) is mounted. With the annular flange (122) being held in the annular groove (112), a first sealing effect is provided to the housing (10).

The engaging device (14) is mounted between the engaging ends of the base (11) and the cover (12) and comprises an engaging recess (144) and an engaging tab (142). The engaging recess (144) is defined in the engaging end of the base (11). The engaging tab (142) is formed on and protrudes from the engaging end of the cover (12) and has at least one engaging hook (143) engaging the engaging recess (144) in the base (11). With the engagement between the engaging tab (142) and the engaging recess (144), the base (11) and the cover (12) are combined together. In the alternative embodiment, the engaging recess (144) is defined in the cover (12) in which an annular groove is defined, and the engaging tab (142) is formed on the base (11) on which an annular flange is formed.

The protrusions (162) and detents (164) are mounted respectively on the base (11) and the cover (12) and engage each other. In a preferred embodiment, the protrusions (162) are formed on the periphery of the annular flange (122) on the cover (12), and the detents (164) are defined in an inner surface of the base (11) and respectively engage the protrusions (162) on the cover (12). With the engagements of the protrusions (162) and the detents (164), the base (11) is combined with the cover (12) securely. In the alternative embodiment, the protrusions (162) are formed on the base (11) in which an annular groove is defined, and the detents (164) are defined in the cover (12) on which an annular flange is formed.

The seal (18) is mounted between the base (11) and the cover (12), is mounted in the annular groove (112) and abuts against the annular flange (122). With the arrangement of the seal (18), a second sealing effect is provided to the housing (10).

With such an arrangement, when the power of the battery is off or some elements are damaged or broken, the cover (12) can be opened relative to the base (11) after disengaging the engaging tab (142) from the engaging recess (144). Accordingly, the battery or broken element can be replaced with a new one to make the air pressure gauge non-disposable and reusable, and the cost for using the air pressure gauge is lowered.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An air pressure gauge comprising:
    a housing being hollow and comprising
        a base having a connecting end and an engaging end;
        a cover pivotally connected to the base and having
            a connecting end pivotally connected with the connecting end of the base with a pivotal tab integrally formed between and connected to the connecting ends of the base and the cover; and
            an engaging end corresponding to and detachably engaging the engaging end of the base;
        an engaging device mounted between the engaging ends of the base and the cover and comprising
            an engaging recess defined in the engaging end of the base; and
            an engaging tab formed on and protruding from the engaging end of the cover and having at least one engaging hook engaging the engaging recess in the base;
        multiple protrusions and detents mounted respectively on the base and the cover and engaging each other; and
        a seal mounted between the base and the cover;
    a circuit board mounted in the housing and provided with a power source;
    a pressure detector mounted in the housing and electrically connected to the circuit board; and
    a display mounted on the housing and electrically connected to the circuit board.

2. The air pressure gauge as claimed in claim 1, wherein
    the base further has an annular groove defined in the base at a side facing the cover;
    the cover further has an annular flange formed on and protruding from the cover at a side facing the base and being extended into and held in the annular groove; and
    the seal is mounted and held in the annular groove in the base and abuts against the annular flange of the cover.

3. The air pressure gauge as claimed in claim 2, wherein
    the protrusions are formed on a periphery of the annular flange on the cover; and
    the detents are defined in an inner surface of the base and respectively engage the protrusions on the cover.

* * * * *